Patented Dec. 10, 1935

2,024,128

UNITED STATES PATENT OFFICE 2,024,128

SMOKELESS POWDER

Willard de C. Crater, Kenvil, N. J., assignor to Hercules Powder Company, Wilmington, Del., a corporation of Delaware No Drawing. Application June 1, 1933, Serial No. 673,855

8 Claims. (Cl. 52—13)

This invention relates to an improved smokeless powder.

Heretofore smokeless powder has generally been produced with nitrated cellulose as a base, either alone in a suitably colloided condition, as in the so-called single base powders, or with the addition of nitroglycerin, as in the so-called double base powders. Attempts have heretofore been made to produce smokeless powder using nitrated starch as a base. However, such attempts have been generally unsuccessful from the commercial standpoint since nitrated starch powders have been exceedingly fast burning and of low stability resulting in excessive breech pressure and rendering their use dangerous.

Now in accordance with this invention there is provided a nitrated starch smokeless powder and more particularly a powder of the double base type having excellent stability and ballistic properties.

The smokeless powder in accordance with this invention will include essentially a nitrated, porous, flaked starch, or nitrated, porous starch flakes, which may be produced by nitrating porous flaked starch with a suitable nitrating mixture, as a mixture of strong sulphuric and strong nitric acids, separating the nitrated product from the mixed acids, washing and boiling with water and finally boiling with a dilute alkali solution and drying.

As illustrative a suitable flake nitrated starch for use in producing a powder in accordance with this invention may be produced by gradually adding with agitation a quantity of flaked starch to a suitable nitrating mixture, say 1 part of flaked starch to 10 parts of sulphuric acid and 5 parts of nitric acid. The nitrating mixture will desirably initially be cooled to a temperature of about 30° F. and will be permitted to rise to about 40° F. with the addition of the flaked starch. After the starch is added the stirring will be continued for about 30 minutes, the temperature being held between about 36–40° F.

When the nitration is complete the nitrated flaked starch will be separated from the nitrating mixture, by skimming after standing, or by filtration, washed and boiled with water, boiled with a dilute alkali solution and finally dried.

The nitrogen content of the product may, as will be obvious, be controlled by varying the composition of the nitrating acids and conditions, as temperature and time, under which the nitration is effected.

The nitrated starch flakes included in the powder in accordance with this invention may have a nitrogen content within wide limits, depending upon the characteristics desired for the powder, as burning rate, amount of nitroglycerin, etc. Generally speaking the starch will have a nitrogen content such that the starch may be colloided with nitroglycerin and hence it will desirably not have so low a nitrogen content as to be practically insoluble by nitroglycerin. Thus, for example, as the nitrogen content of the flaked nitrated starch falls below 10.28% the solubility in nitroglycerin decreases until the material is practically insoluble.

The particular nitrogen content of the flaked nitrated starch for any particular powder in accordance with this invention will be chosen within the range of solubility of the starch in nitroglycerin and particularly with consideration for the amount of nitroglycerin desired to be used and for the burning rate desired for the powder. Generally speaking, lower nitrogen content, say about 10.28% or below, will give a slower burning rate and lower solubility in nitroglycerin, enabling more nitroglycerin to be used, than nitrogen content above about 10.28%.

As illustrative of a double base smokeless powder in accordance with this invention, for example, a satisfactory powder having satisfactory stability and ballistic properties may be made up on the following formula:

| | Percent |
|---|---|
| Flaked nitrostarch | 85 |
| Nitroglycerin | 9 |
| Dinitrotoluol | 6 |

In the above powder the flaked nitrostarch may, for example, have a nitrogen content of 11.82%, a German test of 25 minutes and an explosion test of 7 hours. Also, as will be appreciated, other nitroaromatic compounds as TNT, dinitrobenzene, picric acid, etc. may be substituted for dinitrotoluol.

In making up the powder the dinitrotoluol is dissolved in the nitroglycerin and the solution added to the flaked nitrostarch in the cold. Shortly after the addition the mass is heated to a temperature of say about 135° F. for a period of about 30–40 minutes. The powder will become dry as a result of the heat treatment due to the fact that the heat treatment will cause more complete colloiding of the flaked nitrostarch.

The powder in accordance with the above formula will give excellent ballistics, about 10,000 pounds pressure and about 830 ft. sec. shot charge velocity in a standard trap load.

As further illustrative, a powder in accordance with this invention may be made up on the following formula:

| | |
|---|---|
| Flaked nitrostarch 10.28% nitrogen | 68.6 |
| Nitroglycerin | 31.4 |

The powder made up as described above, as by adding the nitroglycerin to the flaked starch and shortly after the addition heating to effect more complete colloiding will have excellent ballistics and will give a pressure of about 9600 pounds and a shot charge velocity of about 833 ft. sec. in a standard trap load.

Both of the powders described above, by way of illustration, will on firing burn well and will leave practically no residue in the gun barrel.

What I claim and desire to protect by Letters Patent is:

1. A double base smokeless powder including nitrated flaked starch, the nitrated flaked starch retaining substantially its original flaked form.

2. A smokeless powder including nitrated flaked starch and nitroglycerin, the nitrated flaked starch retaining substantially its original flaked form.

3. A smokeless powder including nitrated flaked starch colloided with nitroglycerin, the nitrated flaked starch retaining substantially its original flaked form.

4. A smokeless powder including nitrated flaked starch, dinitrotoluol and nitroglycerin, the nitrated flaked starch retaining substantially its original flaked form.

5. A smokeless powder including nitrated flaked starch colloided with a mixture of dinitrotoluol and nitroglycerin, the nitrated flaked starch retaining substantially its original flaked form.

6. A smokeless powder including nitrated flaked starch, a nitroaromatic compound and nitroglycerin, the nitrated flaked starch retaining substantially its original flaked form.

7. A smokeless powder including nitrated flaked starch, colloided with a mixture of a nitroaromatic compound and nitroglycerin, the nitrated flaked starch retaining substantially its original flaked form.

8. A smokeless powder including nitrated flaked starch having a nitrogen content not substantially below 10.28%, the nitrated flaked starch retaining substantially its original flaked form.

WILLARD DE C. CRATER.